(12) United States Patent
Miyazaki et al.

(10) Patent No.: US 11,092,827 B2
(45) Date of Patent: Aug. 17, 2021

(54) BOOTH AND APPARATUS

(71) Applicant: FUJIFILM BUSINESS INNOVATION CORP., Tokyo (JP)

(72) Inventors: Kana Miyazaki, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/832,516

(22) Filed: Mar. 27, 2020

(65) Prior Publication Data
US 2021/0116728 A1 Apr. 22, 2021

(30) Foreign Application Priority Data

Oct. 16, 2019 (JP) .............................. JP2019-189260

(51) Int. Cl.
*G02F 1/13* (2006.01)
*G02F 1/1333* (2006.01)
*G02F 1/133* (2006.01)
*G06F 3/01* (2006.01)

(52) U.S. Cl.
CPC ........ *G02F 1/1313* (2013.01); *G02F 1/13306* (2013.01); *G02F 1/133308* (2013.01); *G06F 3/013* (2013.01)

(58) Field of Classification Search
CPC .. G09F 9/35; G09F 13/0413; G09F 2027/001; G09F 23/065; G09F 27/00; G09F 19/22; A47F 3/0434; H04N 13/388; H04N 21/41415; H04N 21/44218; B60J 3/04; F21V 23/0471; F25D 2400/36; F25D 2400/361; G06F 1/1647; G06F 1/181; G06F 1/3231; G06F 2203/04804; G06F 3/005; G06F 3/011; G09G 2300/026
See application file for complete search history.

(56) References Cited

U.S. PATENT DOCUMENTS

| | | | | |
|---|---|---|---|---|
| 2010/0157063 | A1* | 6/2010 | Basso | G09F 9/35 348/169 |
| 2014/0144083 | A1* | 5/2014 | Artwohl | G09F 23/065 49/70 |
| 2016/0220039 | A1* | 8/2016 | Chang | F21V 14/08 |
| 2017/0148376 | A1* | 5/2017 | Yoo | G09G 3/20 |

FOREIGN PATENT DOCUMENTS

| | | |
|---|---|---|
| JP | 2011-76560 A | 4/2011 |
| JP | 2017-111313 A | 6/2017 |
| JP | 2017-114671 A | 6/2017 |

* cited by examiner

*Primary Examiner* — Koosha Sharifi-Tafreshi
(74) *Attorney, Agent, or Firm* — Oliff PLC

(57) ABSTRACT

A booth includes at least one display unit that is transmissive and displays an image. The at least one display unit is disposed in such a manner that the inside of a space which allows a person's entrance is viewed from the outside of the space.

19 Claims, 13 Drawing Sheets

BOOTH AND APPARATUS

CROSS-REFERENCE TO RELATED APPLICATIONS

This application is based on and claims priority under 35 USC 119 from Japanese Patent Application No. 2019-189260 filed Oct. 16, 2019.

BACKGROUND (i) Technical Field

The present disclosure relates to a booth and an apparatus.

(ii) Related Art

For example, Japanese Unexamined Patent Application Publication No. 2017-111313 discloses a transmissive display. In the case where the transmissive display is to display an image, the image is displayed on a transmissive liquid crystal panel, and the transmissive liquid crystal panel is illuminated from the back by using a light source unit and a transmissive light guide plate. Thus, a light control sheet disposed between the transmissive liquid crystal panel and the transmissive light guide plate is switched to the diffusion state. In the case where the transmissive display is to display an exhibit, the entire transmissive liquid crystal panel is made white, causing the panel to be transparent. The light source unit is switched to no light or dim light. Further, the light control sheet is made transparent.

In the related art, for example, a transmissive display is capable of causing its back area to be viewed transparently.

SUMMARY

Aspects of non-limiting embodiments of the present disclosure relate to a booth having a transmissive display unit that displays images and that is disposed so that the inside of the space, which allows persons' entrance, is viewed from the outside of the space.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a booth including at least one display unit that is transmissive and displays an image. The at least one display unit is disposed in such a manner that the inside of a space which allows a person's entrance is viewed from the outside of the space.

BRIEF DESCRIPTION OF THE DRAWINGS

Exemplary embodiments of the present disclosure will be described in detail based on the following figures, wherein.

DETAILED DESCRIPTION

Figure 1:
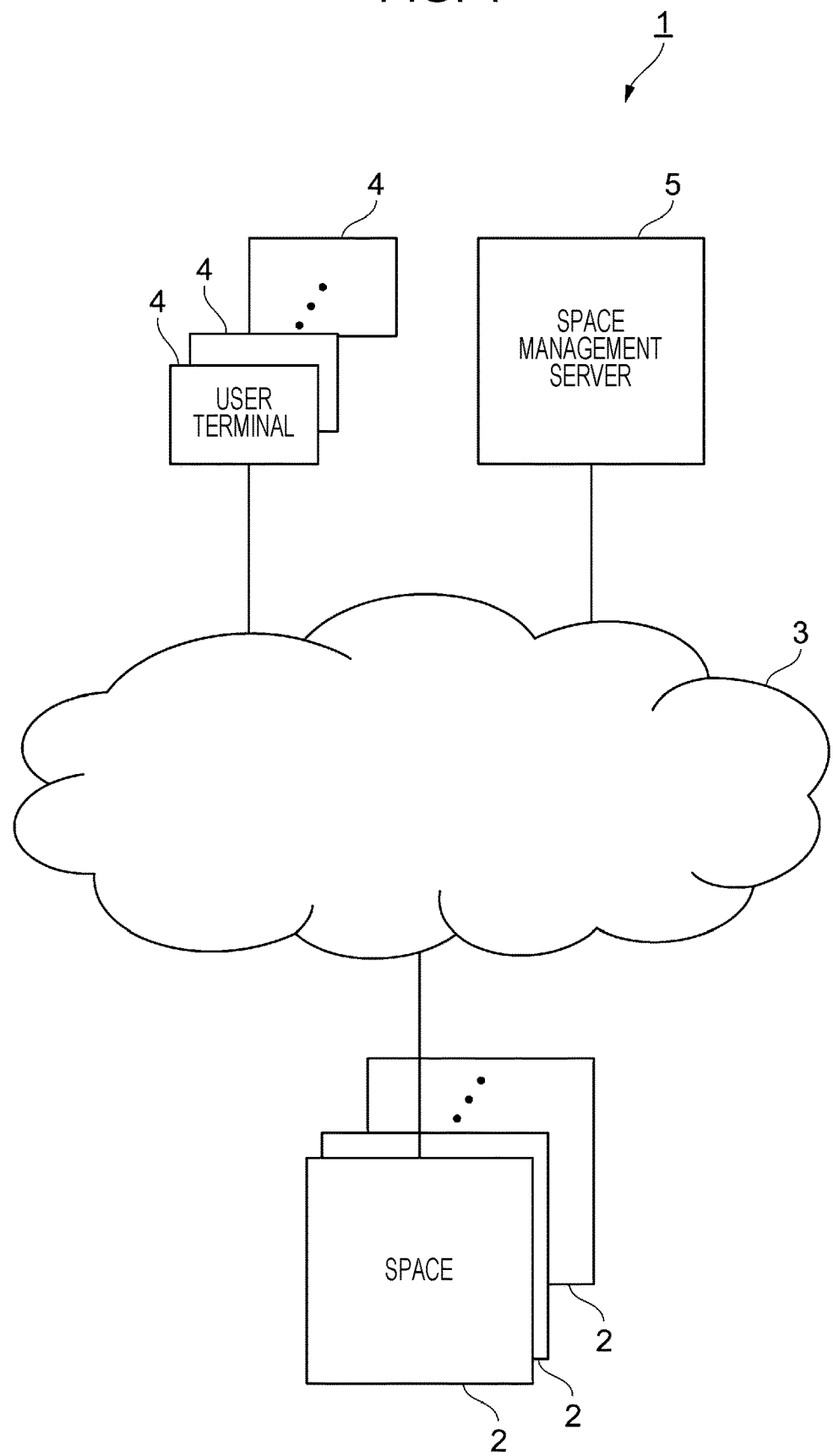
FIG. 1 is a schematic diagram illustrating an exemplary entire configuration of an information processing system according to the present exemplary embodiment.

Referring to the drawings, exemplary embodiments of the present disclosure will be described below.

The Entire Configuration of an Information Processing System

FIG. 1 is a schematic diagram illustrating an exemplary entire configuration of an information processing system 1 according to the present exemplary embodiment. The information processing system 1 according to the present exemplary embodiment includes various apparatuses and spaces 2 which are connected to a cloud network 3.

Each space 2 is a location which allows persons' entrance, and is separated from the surrounding area by using walls, dividers, partitions, and the like. Specifically, examples of a space 2 include a private work room, a room in a building, a room in a lodging facility or the like, and a meeting space in a company or the like. The space 2 may be a movable location such as an automobile. In the present exemplary embodiment, the space 2 is used as an exemplary booth or apparatus.

The space 2 according to the present exemplary embodiment is given a name, a number, or the like for the sake of management. The space 2 may be reserved with or without charge.

In the case where an electronic lock is attached to a door of the space 2, the space 2 is used under the condition that a user owns an electronic key distributed in advance. In the case where the space 2 does not have a door, the space 2 is used, for example, under the condition that a user is authenticated by using an authentication code distributed in advance or that a manager of the space 2 checks the name of a user who is going to use the space 2.

A user themselves who is going to use a space 2 may reserve the space 2, or a different user may reserve the space 2 instead of the user who is going to use the space 2.

The example in FIG. 1 illustrates user terminals 4 operated by users, and a space management server 5 for managing the spaces 2, as examples of the apparatuses connected to the cloud network 3. The spaces 2 are also connected to the cloud network 3. More specifically, various devices are disposed in or on the spaces 2, and these devices are connected to the cloud network 3.

A single company or multiple companies may manage a certain space 2. For example, different companies may be in charge of management of reservations, management of authorization for use, management of entrance and exit, room utilization, and the like, management of billing users for their use of the spaces 2, and management of members registered as users, respectively. In addition, the spaces 2 may be managed by corresponding different companies.

As described above, the spaces 2 managed as reservation targets are not necessarily of the same type. For example, some of the spaces 2 may be rooms in lodging facilities or the like, and some of the spaces 2 may be meeting spaces.

Additionally, multiple companies may cooperate with each other to provide management for a single purpose or function.

The user terminals 4 are used by users. In the present exemplary embodiment, assume that, for example, smartphones, which may be carried by users, are used as the user terminals 4. The user terminals 4 may be so-called wearable terminals, notebook computers, and game terminals.

The space management server 5 manages various types of information associated with the spaces 2. The space management server 5 controls various devices disposed in or on the spaces 2. Specifically, the space management server 5 controls display on a display unit 21 described below.

The space management server 5 may manage reservations for goods and services which are associated with the spaces 2. For example, the space management server 5 may manage goods and services that are allowed to be lent or used, and consumable goods and services.

FIG. 1 illustrates only a single apparatus as the space management server 5. However, multiple apparatuses may be prepared. That is, the functions of the space management server 5 may be implemented, not by using a single apparatus, but by using multiple apparatuses. In addition, space management servers 5 may be disposed in the respective spaces 2. Each of the space management servers 5 disposed in the respective spaces 2 may control the various devices in the space 2.

The Configuration of a Space

Figure 2:
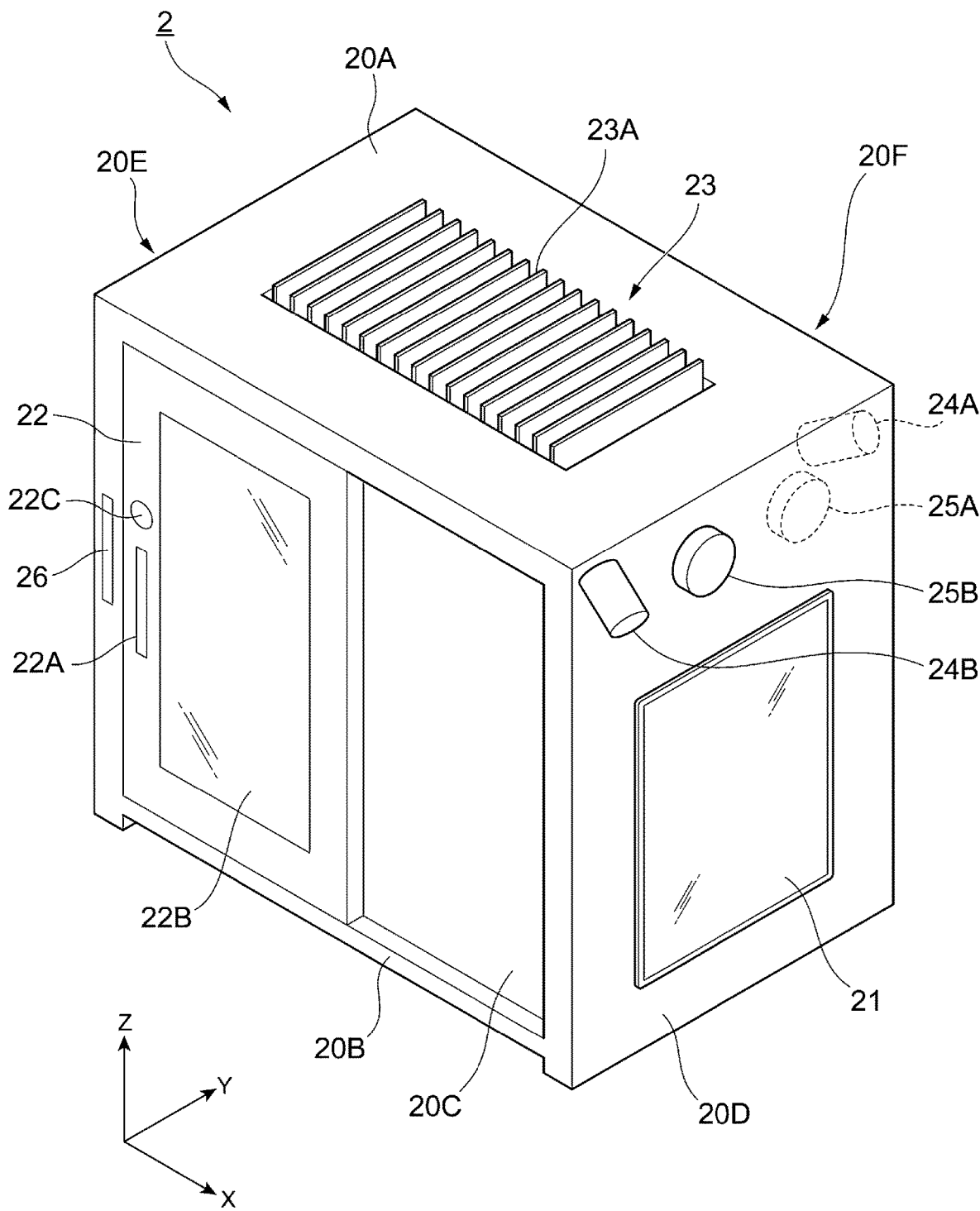
FIG. 2 is a diagram for describing an exemplary external configuration of a space.

FIG. 2 is a diagram for describing an exemplary external configuration of a space 2.

The space 2 illustrated in FIG. 2 is disposed anywhere, for example, indoors or outdoors, for example, in a station building, an airport, an office building, a commercial facility, such as an eating place or a department store, a bank, a library, a museum including an art museum, a public institution and facility, a walkway, or a park.

The space 2 illustrated in FIG. 2 is a closed booth to which a ceiling is attached. As long as the space 2 has a space which allows persons' entrance, and is a place separated from the surrounding area, the shape and structure of the building frame, which forms the space 2, and the facilities and performance, which are provided, may be any. For example, a configuration without a ceiling 20A may be employed. Openings and apertures, such as vents and small windows, may be disposed in a part of the building frame which forms the space 2. The windows may be openable.

The building frame of the space 2 illustrated in FIG. 2 includes the ceiling 20A, a floor 20B, a wall 20C to which a door 22 is attached so as to be openable, two walls 20D and 20E positioned on both sides of the wall 20C, and a wall 20F positioned opposite the door 22.

A ventilating opening 23 is attached to the ceiling 20A. A louver 23A whose opening area is adjustable is attached to the ventilating opening 23. The louver 23A in FIG. 2 is full open.

In the present exemplary embodiment, as an example, assume that the door 22 is a sliding door which is movable along the wall 20C. In the example in FIG. 2, the door 22 is a single sliding door which is slid in one direction. The door 22 may be a double sliding door having two or more members passing by each other to be opened/closed, or a double sliding door having two members moving to the right and the left, respectively. A handle 22A gripped by a person when the door 22 is to be opened/closed is attached to the door 22. An electronic lock 22C for enabling the door 22 to be locked and unlocked is attached to the door 22.

In a center portion of the door 22, a member 22B which undergoes processing for invisibility and crime prevention is disposed. The member 22B may be, for example, a transparent plate, to which a metal plate (for example, a punching metal) in which many holes are arranged is attached inside, a transparent plate, to which a member serving as a blinder is attached inside with a clearance, a transparent plate to which a film for making it easy to check the inside from the front and making it difficult to check the inside in an oblique direction is attached, or a transparent plate which undergoes processing to reduce viewability of the inside. The processing may be performed on a part of the member 22B.

The processing for invisibility and crime prevention may be performed on members other than the door 22. For example, at least a part of the walls 20D, 20E, and 20F may undergo the processing for invisibility and crime prevention.

The number of persons who use the space 2 is defined approximately by the capacity of the space 2. The space 2 illustrated in FIG. 2 is assumed to be a private room used typically by a small number of people, one to three persons. However, the space 2 according to the present exemplary embodiment may be a big room in which a large number of people may be accommodated. The large room may be formed of a single room. Alternatively, the large room may be formed by connecting multiple spaces 2 from which one or both of the walls 20D and 20E are removed.

The wall 20D has a transmissive display unit 21 displaying images. The transmissive display unit 21 enables its back area to be viewed transparently, and is disposed so that the inside of the space 2 may be viewed from the outside of the space 2. When the display unit 21 is viewed from the inside of the space 2, the outside of the space 2 may be recognized visually. In addition, the display unit 21 may display images for persons inside the space 2, and may display images for persons outside the space 2.

Additionally, the inside of the space 2 may be viewed from the outside of the space 2 through the display unit 21. Thus, for example, the state of the inside or whether or not the space 2 is vacant is checked. Further, the outside of the space 2 may be viewed from the inside of the space 2 through the display unit 21. Thus, for example, the state of the outside or whether or not persons are present close to the space 2 is checked. In addition, for example, a person inside the space 2 feels as if the space 2 is wider than as it is.

The space management server 5 controls display on the display unit 21. Alternatively, for example, instead of the space management server 5, the display unit 21 itself may control the display.

A photographing apparatus 24A formed of a camera or the like for photographing the inside of the space 2, and a human detecting sensor 25A detecting persons inside the space 2 are disposed inside the space 2.

On the outside surface of the space 2, a photographing apparatus 24B formed of a camera or the like for photographing the outside of the space 2, and a human detecting sensor 25B detecting persons outside the space 2 are disposed.

On the outside surface of the space 2, an information acquisition apparatus 26 for obtaining information about individual users who use the space 2 is disposed. The information acquisition apparatus 26 is formed, for example, of a reader which reads ID cards presented by users. Other than this, the information acquisition apparatus 26 may be a reader which reads fingerprints, vein arrangements, or the like of users.

Other various sensors (not illustrated in FIG. 2) may be disposed in or on the space 2. Examples of the other various sensors include a directional microphone used to collect sounds inside the space 2, a directional microphone used to collect sounds outside the space 2, an acceleration sensor or gyroscope detecting a motion of an object, a global positioning system (GPS) sensor which receives radio waves from a GPS satellite and which measures the position of the space 2. These various sensors may be attached to the display unit 21.

The Configuration of the Display Unit

Figure 11:
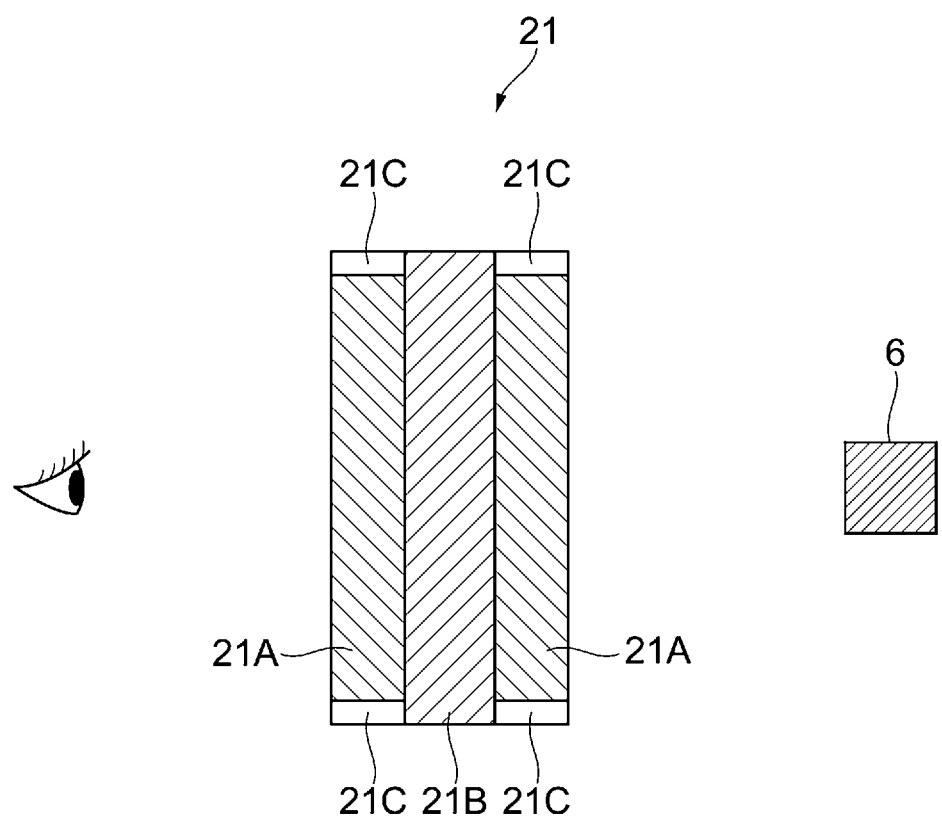
FIG. 11 is a diagram for describing an exemplary configuration of a display unit according to the present exemplary embodiment.

FIG. 11 is a diagram for describing an exemplary configuration of the display unit 21 according to the present exemplary embodiment.

As described above, the display unit 21 is a transmissive display which displays images. The display unit 21 includes two glass substrates 21A disposed on the front and the back, a transmissive liquid crystal panel 21B disposed between the two glass substrates 21A, and light source units 21C. The light source units 21C are disposed in end portions of the glass substrates 21A. A light source unit 21C is, for example, a light emitting diode (LED) light source. The light source units 21C are opaque. However, since these members are disposed in the end portions of the glass substrates 21A, a person views an object 6 through the display unit 21.

For example, the light source units 21C emit red light, green light, and blue light in order at intervals of five milliseconds for each color in a repeated cycle. The light emitted from the light source units 21C travels while being reflected between the glass substrates 21A and the transmissive liquid crystal panel 21B. A voltage is applied to certain pixels of the transmissive liquid crystal panel 21B so that the orientation of the liquid crystal is changed. Thus, light is scattered, causing target positions to glow. In accordance with the timings at which the light source units 21C emit red light, green light, and blue light, the liquid crystal of the transmissive liquid crystal panel 21B is controlled, achieving representation of a full-color video.

Such control enables a person to view images (including moving images and still images) displayed on the display unit 21, and enables a person to view the object 6 through the display unit 21.

The example in FIG. 11 is an exemplary configuration of the display unit 21. As long as the display unit 21 is transmissive and displays images, the display unit 21 is not limited to the example in FIG. 11. For example, as the display unit 21, a transmissive organic light-emitting diode display using organic electro-luminescence (EL) may be used, or a transmissive inorganic light-emitting diode display using inorganic EL may be used.

The Hardware Configuration of the Space Management Server

Figure 3:
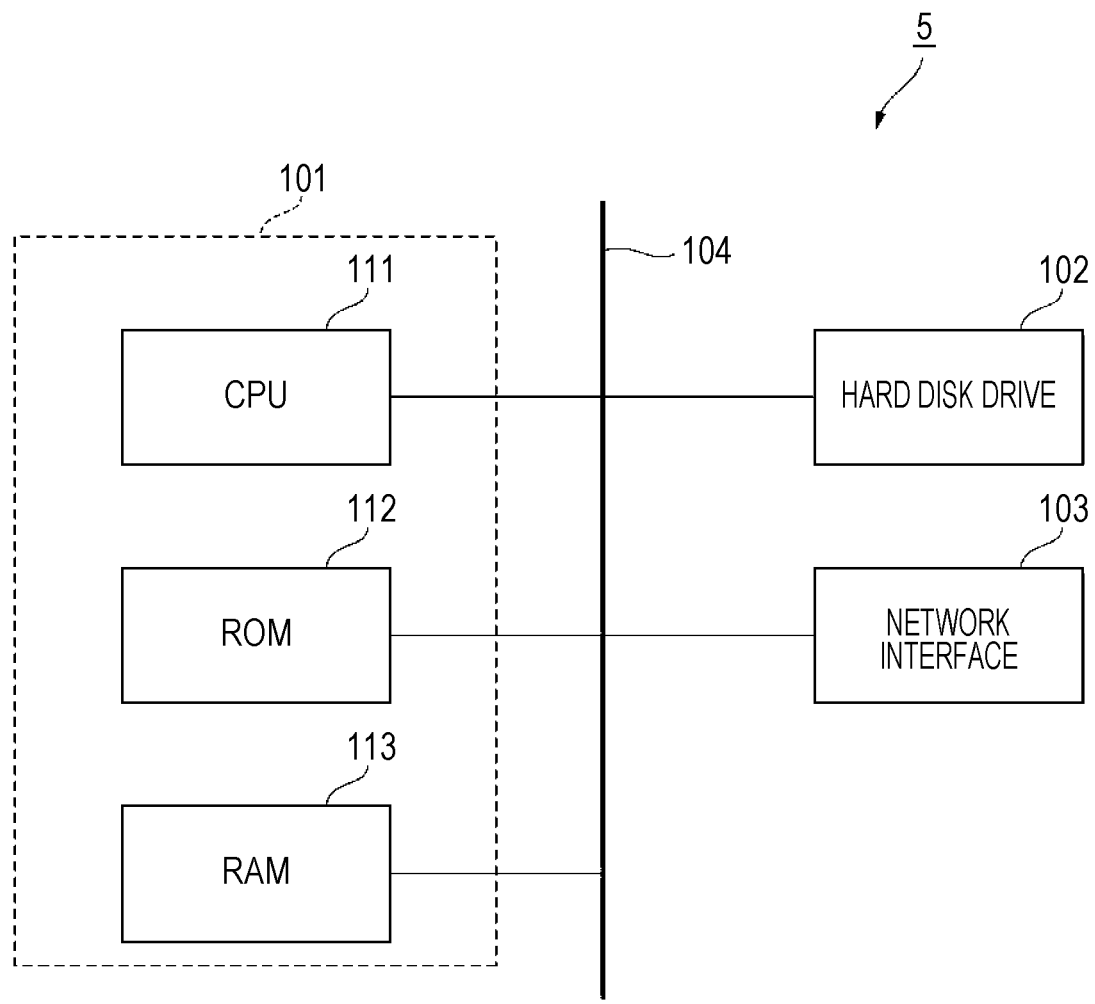
FIG. 3 is a diagram for describing an exemplary hardware configuration of a space management server according to the present exemplary embodiment.

FIG. 3 is a diagram for describing an exemplary hardware configuration of the space management server 5 according to the present exemplary embodiment.

The space management server 5 includes a control unit 101 that controls the operations of the entire apparatus, a hard disk drive 102 that stores management data and the like, and a network interface 103 that implements communication through local area network (LAN) cables and the like.

The control unit 101 includes a central processing unit (CPU) 111, a read only memory (ROM) 112 which is used to store basic software, a basic input output system (BIOS), and the like, and a random access memory (RAM) 113 used as a work area. The CPU 111 may have a multi-core CPU. The ROM 112 may be a rewritable nonvolatile semiconductor memory. The control unit 101 is a so-called computer.

The hard disk drive 102 is a device which reads/writes data from/in a nonvolatile storage medium having a disk substrate whose surface is applied with a magnetic material. Alternatively, the nonvolatile storage medium may be a semiconductor memory or a magnetic tape.

Other than these, the space management server 5 includes an input device, such as a keyboard and mouse, and a display device such as a liquid crystal display, when necessary.

The control unit 101, the hard disk drive 102, and the network interface 103 are connected to each other through a bus 104 or a signal line (not illustrated).

The Functional Configuration of the Space Management Server

Figure 4:
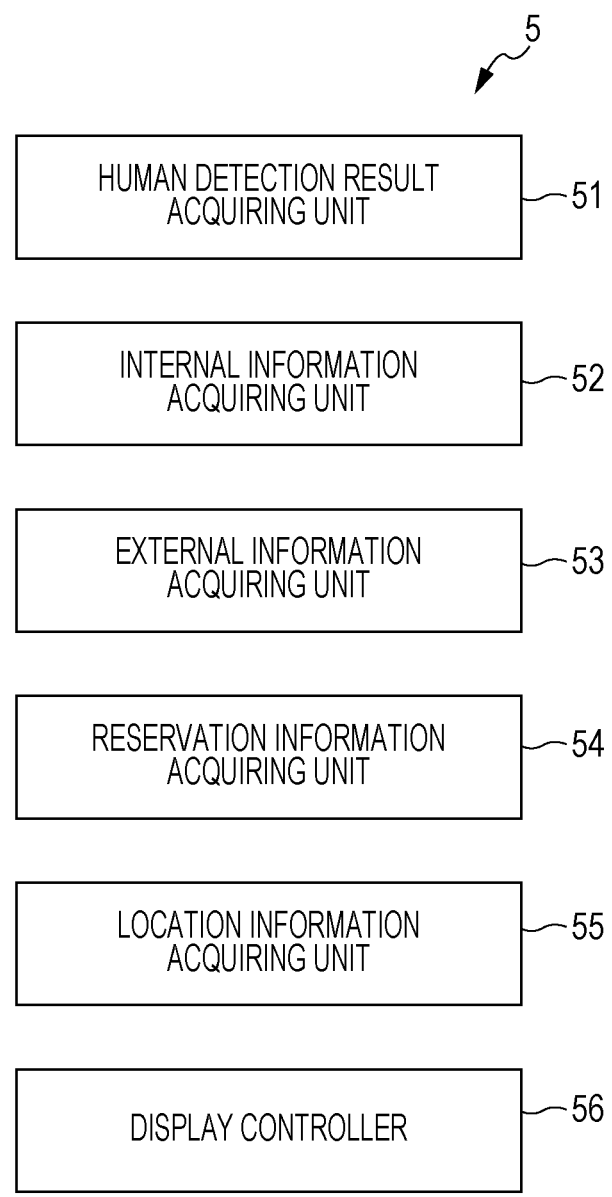
FIG. 4 is a diagram for describing an exemplary functional configuration of a space management server.

FIG. 4 is a diagram for describing an exemplary functional configuration of the space management server 5. The space management server 5 includes a human detection result acquiring unit 51, an internal information acquiring unit 52, an external information acquiring unit 53, a reservation information acquiring unit 54, a location information acquiring unit 55, and a display controller 56.

The human detection result acquiring unit 51 obtains human detection results. The human detection results indicate, for example, a detection result describing whether or not a person is present inside a space 2, and a detection result describing whether or not a person is present outside a space 2. The human detection results are collected, for example, by the human detecting sensor 25A and the human detecting sensor 25B, and are transmitted to the space management server 5.

The internal information acquiring unit 52 obtains information received from persons inside a space 2. For example, the internal information acquiring unit 52 obtains information received through operations performed by persons inside a space 2, or obtains information received through voices of persons inside a space 2.

The external information acquiring unit 53 obtains information received from persons outside a space 2. For example, the external information acquiring unit 53 obtains information received through operations performed by persons outside a space 2, or obtains information received through voices of persons outside a space 2.

The reservation information acquiring unit 54 obtains information about reservations of the spaces 2 (hereinafter referred to as "reservation information"). For example, the reservation information acquiring unit 54 obtains reservation information from a reservation management server (not illustrated) managing reservations of the spaces 2. The reservation information includes, for example, information about a person who has reserved a space 2, information about users who are going to use the space 2, the purpose of the reservation of the space 2, the duration of the reservation of the space 2, and information which is set by the person who has made the reservation.

The location information acquiring unit 55 obtains information about the locations of the spaces 2 (hereinafter referred to as "location information"). The location information includes, for example, information about the environments around the spaces 2, and information about travelling of spaces 2.

The location information is collected, for example, by using various sensors, such as the photographing apparatus 24A, the photographing apparatus 24B, the directional microphones, and the acceleration sensor, which are disposed in or on the space 2, and is transmitted to the space management server 5. In addition, for example, a photographing apparatus is disposed at a position different from that of the space 2. Information obtained by using the photographing apparatus photographing the space 2 may be used as the location information. Further, for example, the location information may be information collected by using the Internet, such as information about the temperature and weather in the location of a space 2. In addition, the location information may be, for example, information registered in the space management server 5 by a user, such as the addresses of the spaces 2. Further, the location information is not limited to current information, and may be information obtained from prediction of the future. Examples of information obtained from prediction of the future include weather forecast information.

The display controller 56 controls display on the display unit 21. The display controller 56 controls display on the display unit 21, for example, on the basis of human detection results obtained by the human detection result acquiring unit 51, information obtained by the internal information acquiring unit 52, information obtained by the external information acquiring unit 53, reservation information obtained by the reservation information acquiring unit 54, and location information obtained by the location information acquiring unit 55.

The functional units of the space management server 5 are implemented by software and hardware resources cooperating with each other. Specifically, when the space management server 5 is implemented by using the hardware configuration illustrated in FIG. 3, for example, programs stored in the hard disk drive 102, the ROM 112, and the like are read into the RAM 113, and are executed by the CPU 111. Thus, the functional units, such as the human detection result acquiring unit 51, the internal information acquiring unit 52, the external information acquiring unit 53, the reservation information acquiring unit 54, the location information acquiring unit 55, and the display controller 56, are implemented.

The Procedure of the Space Management Server

Figure 5:
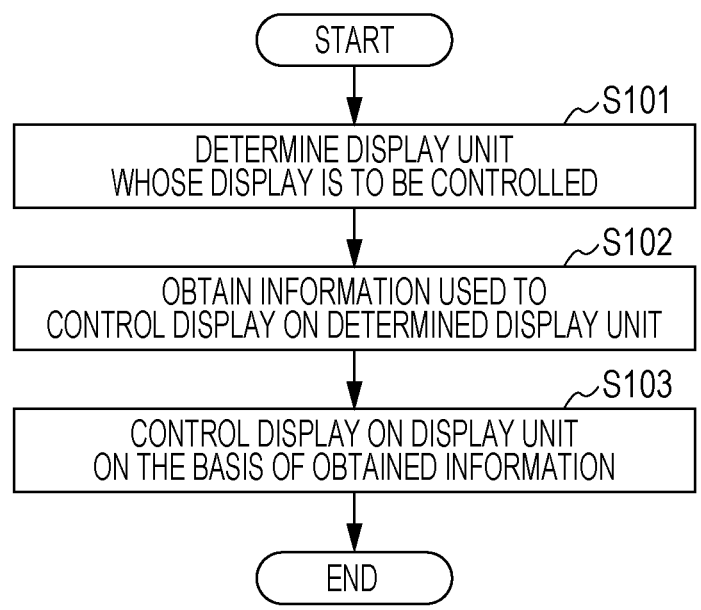
FIG. 5 is a flowchart of an exemplary procedure performed by a space management server.

FIG. 5 is a flowchart of an exemplary procedure performed by the space management server 5. The process illustrated in FIG. 5 is performed, for example, periodically (for example, every second).

In the description below, a step in the process is represented by a symbol, "S".

First, the display controller 56 determines a display unit 21 whose display is to be controlled (S101). For example, the display controller 56 determines a display unit 21 whose display is to be controlled, among the display units 21 disposed in the respective spaces 2.

Then, the display controller 56 obtains information used to control display on the display unit 21 determined in S101 (S102). Examples of the information obtained in this step include human detection results obtained by the human detection result acquiring unit 51, the reservation information obtained by the reservation information acquiring unit 54, and the location information obtained by the location information acquiring unit 55.

The display controller 56 controls display on the display unit 21 on the basis of the information obtained in S102 (S103). Then, the process end.

Specific Examples of the Process Performed by the Space Management Server

Specific examples of the process performed by the space management server 5 will be described.

The Case in which a Display on a Display Unit is Changed on the Basis of Human Detection Results The case in which a display on a display unit 21 is changed on the basis of human detection results will be described. FIGS. 6A to 6D are diagrams for describing exemplary cases in which a display on a display unit 21 is changed on the basis of human detection results. In the examples, assume that a display on a display unit 21 is changed on the basis of a detection result indicating whether or not persons are present inside the space 2, and a detection result indicating whether or not persons are present outside the space 2.

Figure 6A:
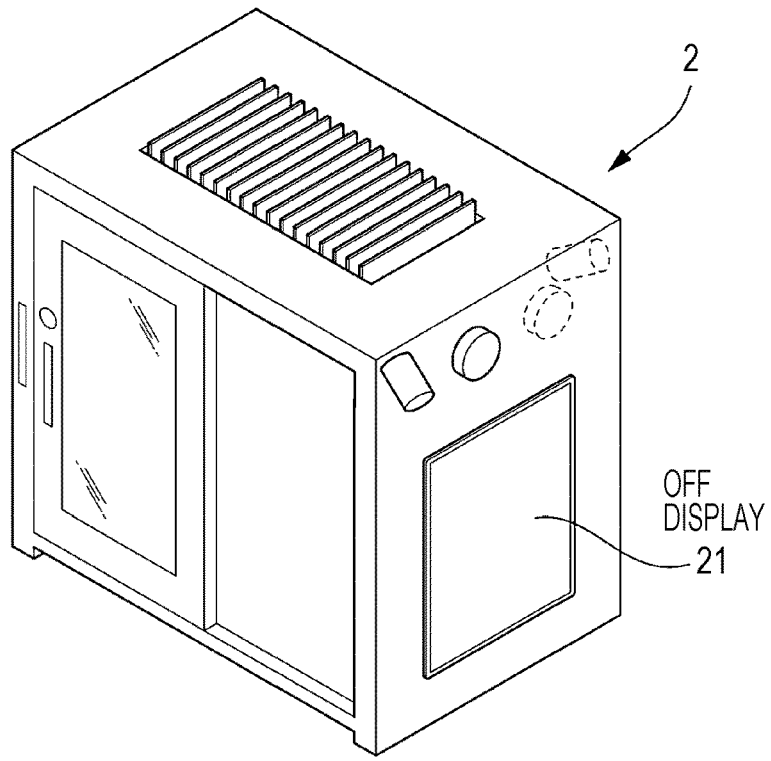
FIGS. 6A to 6D are diagrams for describing examples in the case where a display on a display unit is changed on the basis of human detection results.

For example, as illustrated in FIG. 6A, in the case where persons are present neither inside nor outside a space 2 (that is, the case where no persons are detected inside and outside the space 2), the display controller 56 turns off display on the display unit 21. The term, "turn off display", means the state in which the display unit 21 has started up but no display has been performed, or the state in which the power is turned off. In this case, nothing is displayed on the display unit 21, and the inside of the space 2 may be recognized visually from the outside of the space 2.

Figure 6B:
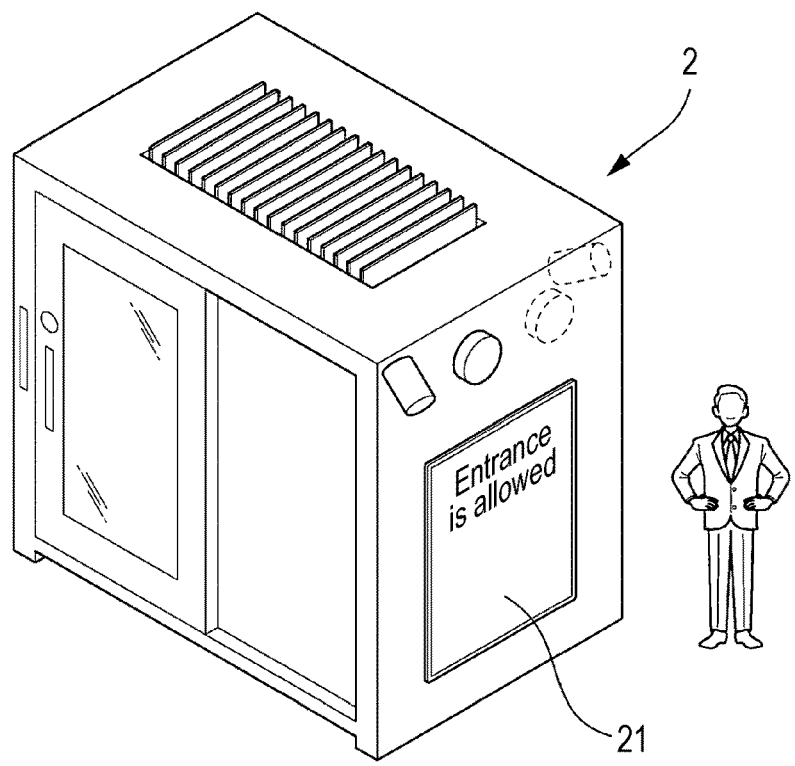

For example, as illustrated in FIG. 6B, in the case where no persons are present inside the space 2 and where a person is present outside the space 2 (that is, the case where no persons are detected inside the space 2 and a person is detected outside the space 2), the display controller 56 controls display on the display unit 21 so that an image is displayed for the person outside the space 2.

In this example, a string, "Entrance is allowed," is displayed as a message for notifying the person outside that no persons are present inside. A touch panel display (hereinafter simply referred to as a "touch panel") may be used as the display unit 21, and operations for entering the space 2 may be received from the person outside.

If the string, "Entrance is allowed," is viewed from the inside of the space 2, the string itself may be recognized visually, but is viewed as a so-called mirror writing (that is, a string whose orientation is reversed).

Figure 6C:
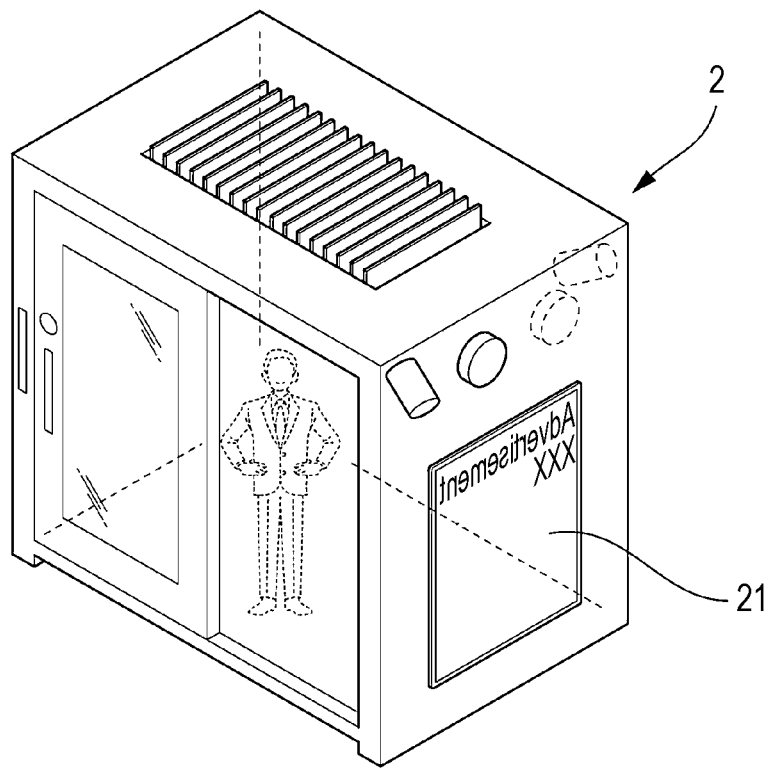

For example, as illustrated in FIG. 6C, in the case where a person is present inside the space 2 and no persons are present outside the space 2 (that is, the case where a person is detected inside the space 2 and no persons are detected outside the space 2), the display controller 56 controls display on the display unit 21 so that an image is displayed for the person inside the space 2.

In this example, a string, "Advertisement XXX", is displayed for the person inside as an advertisement. When the advertisement is viewed from the outside of the space 2 as illustrated in FIG. 6C, the advertisement is viewed as a so-called mirror writing.

Figure 6D:
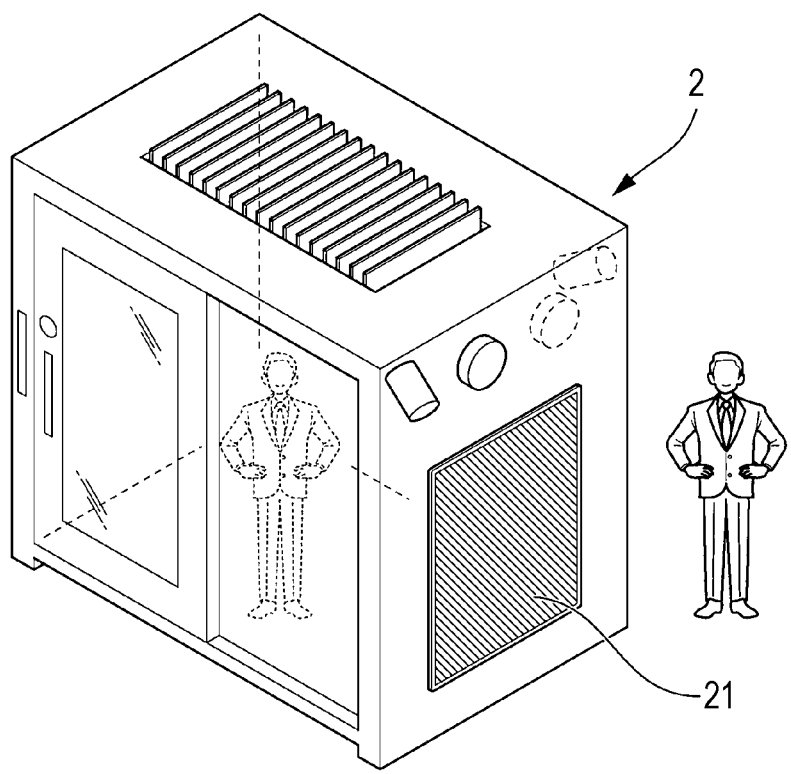

For example, as illustrated in FIG. 6D, in the case where persons are present both inside and outside the space 2 (that is, the case where persons are present both inside and outside the space 2), the display controller 56 controls display on the display unit 21 in the following manner: a specific image is displayed for the person inside the space 2, and a different image is displayed so that the inside of the space 2 is not capable of being recognized visually from the outside of the space 2 through the display unit 21.

In this example, a string, "Persons are present nearby," is displayed as a message for notifying the person inside that there is a person near the space 2, which is not illustrated in FIG. 6D. In the other display area, for example, a white or black opaque image is displayed. Thus, the string, "Persons are present nearby," is viewed from the inside, while the inside is not capable of being recognized visually from the outside through the display unit 21. In this example, the string, "Persons are present nearby," is an exemplary specific image, and the opaque image is an exemplary different image.

In display of an opaque image, for example, the opaque image may be displayed on the entire surface of the display area of the display unit 21, or may be displayed in a part of the display area of the display unit 21, such as a lower half of the display area of the display unit 21.

Thus, display on the display unit 21 is controlled on the basis of a detection result indicating whether or not persons are present inside the space 2 and a detection result indicating whether or not persons are present outside the space 2.

These examples are exemplary cases in which display on the display unit 21 is controlled on the basis of human detection results, and the configuration for this kind of display control is not limiting. For example, in the case of FIG. 6D, an opaque image may be displayed, and information may be displayed for persons outside, not for persons inside. Specifically, for example, an opaque image may be displayed, and a string, "No entrance is allowed," may be displayed as a message for notifying persons outside that persons are present inside.

These examples use detection results for both the inside and the outside of the space 2. Alternatively, one of the detection results, not both the detection results, may be used.

For example, display on the display unit 21 may be controlled on the basis of only a detection result indicating whether or not persons are present inside the space 2. Specifically, for example, in the case where persons are present inside the space 2, the display controller 56 controls display on the display unit 21 so that an image is displayed for the inside of the space 2. In the case where no persons are present inside the space 2, the display controller 56 controls display on the display unit 21 so that an image is displayed for the outside of the space 2.

For example, display on the display unit 21 may be controlled on the basis of only a detection result indicating whether or not persons are present outside the space 2. Specifically, for example, in the case where persons are present outside the space 2, the display controller 56 controls display on the display unit 21 so that an image is displayed for the outside of the space 2. In the case where no persons are present outside the space 2, the display controller 56 turns off display on the display unit 21.

The Case in which a Display on a Display Unit is Changed on the Basis of Reservation Information The case in which a display on a display unit 21 is changed on the basis of the reservation information will be described. The display controller 56 controls turning on and off of a display unit 21, or changes the content of an image (for example, an advertisement) displayed on the display unit 21, on the basis of the reservation information.

For example, the display controller 56 controls display on the display unit 21 on the basis of information, which is included the reservation information and which describes the purpose of a reservation of the space 2. Specifically, for example, when the purpose is a secret business negotiation or storage of unpublished goods, the display controller 56 displays an opaque image in the display area of the display unit 21 in order to make the inside of the space 2 invisible from the outside of the space 2. For example, when the purpose is exhibition, in order to make the inside of the space 2 visible from the outside of the space 2, the display controller 56 controls display on the display unit 21 so that an announcement of the exhibition is displayed and no images are displayed in the other display area.

For example, the display controller 56 controls display on the display unit 21 on the basis of information which is included in the reservation information and which describes the duration in which a reservation of the space 2 is made. Specifically, for example, when the duration, in which the reservation for the space 2 is made, corresponds to daytime hours, the display controller 56 controls display on the display unit 21 so that a transmissive colored image is displayed to block the sunlight. For example, when the duration, in which the reservation of the space 2 is made, corresponds to night hours, the display controller 56 controls display on the display unit 21 so that an image, which is more transmissive than an image displayed in the daytime, is displayed.

For example, the display controller 56 may display information indicating whether or not the space 2 is vacant at the present time, or information indicating when the space 2 is vacant and may be reserved for use, on the basis of information about the durations in which the space 2 is reserved. Alternatively, the display controller 56 may display guidance information about vacant spaces 2 located nearby, such as a message, "An adjacent space 2 is vacant," "A space 2 at a distance of 100 meters is vacant," or the like.

For example, the display controller 56 controls display on the display controller 56 on the basis of information which is included in the reservation information and which is set by a person who has reserved the space 2. Specifically, for example, a person, who has reserved the space and does not want the inside of the space 2 to be viewed, makes, as the reservation information, such a setting that an opaque image is displayed. In this case, the display controller 56 controls display on the display unit 21 so that an opaque image is displayed in the duration in which the person has made the reservation. For example, a person, who presents an exhibition, makes, as the reservation information, such a setting that an announcement of the exhibition is displayed and no images are displayed in the other display area. In this case, the display controller 56 controls display on the display unit 21 so that, in the duration in which the person has made the reservation, the announcement of the exhibition is displayed and no images are displayed in the other display area.

Other than these, for example, the display controller 56 may control turning on and off of the display unit 21 or may change the content of an image (for example, an advertisement) displayed on the display unit 21, on the basis of information about attributes (for example, the sex, age, and nationality) of the person who has reserved the space 2 or the users of the space 2.

The Case in which a Display on a Display Unit is Changed on the Basis of Location Information The case in which a display on a display unit 21 is changed on the basis of the location information will be described. The display controller 56 controls turning on and off of the display unit 21 or changes the content of an image (for example, an advertisement) displayed on the display unit 21, on the basis of the location information.

For example, the display controller 56 controls display on the display unit 21 on the basis of information which is included in the location information and which describes the environment around the space 2. Specifically, for example, the display controller 56 controls display on the display unit 21 on the basis of information about the color around the space 2 which serves as information about the environment around the space 2. For example, when the color around the space 2 is white, the display controller 56 controls display on the display unit 21 so that a white image is displayed. For example, when the color around the space 2 is blue, the display controller 56 controls display on the display unit 21 so that a blue image is displayed. Thus, an image of the same color as the color around the space 2 is displayed. Thus, a display on the display unit 21 matches the surrounding interior.

Other examples of information about the environment around a space 2 include information about the volume of sounds around the space 2, how busy is the area around the space 2, how sunny or bright the space 2 is, the temperature, the humidity, the weather, and the like.

For example, the display controller 56 controls display on the display unit 21 on the basis of information which is included in the location information and which describes travelling of the space 2. Specifically, for example, the display controller 56 controls display on the display unit 21 in accordance with the travelling of the space 2. For example, while the space 2 is travelling, the display controller 56 turns off display on the display unit 21. When the space 2 is stopped, the display controller 56 controls display on the display unit 21 so that a specific image such as an advertisement is displayed.

Other than these, examples of information about travelling of the space 2 include information about the travelling speed of the space 2 and the like.

For example, the display controller 56 controls display on the display unit 21 on the basis of information which is included in the location information and which describes a region to which the space 2 belongs. Specifically, for example, when the space 2 is located in an urban area, the display controller 56 controls display on the display unit 21 so that an opaque image is displayed on the display unit 21. For example, when the space 2 is located in a mountain area, the display controller 56 turns off display on the display unit 21. Thus, display on the display unit 21 is controlled in accordance with the type of the region to which the space 2 belongs.

Other than these, examples of information about the region to which a space 2 belongs include information about the location name, such as Tokyo or Osaka, and information indicating whether the space 2 is located in a domestic region or in a foreign region.

For example, the display controller 56 controls display on the display unit 21 on the basis of information which is included in the location information and which indicates an attribute of the location of the space 2.

Examples of an attribute of the location of a space 2 include information about a facility in which the space 2 is present, such as an office, a hospital, a school, a station, an airport, or a department store. For example, an attribute of the location of a space 2 may be information about a road, such as a freeway or an ordinary road. The attribute of the location of a space 2 is determined, for example, on the basis of the address of the space 2 or the position information obtained from a GPS sensor. Each space 2 may be given its attribute in advance.

For example, when the attribute of the location of a space 2 indicates an office, the display controller 56 controls display on the display unit 21 so that an opaque image is displayed on the display unit 21. For example, when the attribute of the location of a space 2 indicates a hospital, the display controller 56 displays an advertisement image on the display unit 21, or displays the content by using characters whose sizes are equal to or larger than a threshold.

For example, the display controller 56 controls display on the display unit 21 on the basis of information which is included in the location information and which describes users who are present at the location of the space 2.

Examples of information about users who are present at the location of a space 2 include information indicating that many office workers are present, information indicating that many elderly people are present, and information indicating that many children are present. What kind of users are present at the location of a space 2 is determined in accordance with the location of the space 2. For example, when the space 2 is an office, it is determined that many office workers are present. For example, when the space 2 is a popular place for elderly people, it is determined that many elderly people are present. As described above, the information about the location is determined, for example, on the basis of the address of the space 2, position information obtained by using a GPS sensor, and the attribute given to each space 2. For example, what kind of users are present may be determined from images obtained through photographing using the photographing apparatus 24A and the photographing apparatus 24B.

For example, when many office workers are present at the location of a space 2, the display controller 56 controls display on the display unit 21 so that an opaque image is displayed on the display unit 21. For example, when many elderly people are present at the location of a space 2, the display controller 56 displays an advertisement image on the display unit 21, or displays content by using characters whose sizes are equal to or larger than a threshold.

For example, on the basis of the location information, the display controller 56 may control display on the display unit 21 so that, when the location of the space 2 satisfies a specific condition, a display that is prohibited in a location satisfying the specific condition is not made.

Specifically, for example, assume that a law in a specific region prohibits display of an image in a crowded location to avoid hindering traffic. In this case, the display controller 56 determines whether or not the area around the space 2 in the specific region is a crowded area on the basis of information how crowded the area around the space 2 is. If the display controller 56 determines that the area around the space 2 is a crowded area, the display controller 56 turns off display on the display unit 21.

It is determined how crowded an area is, in the following manner. For example, an image obtained from the photographing apparatus 24B is analyzed. If the number of people photographed in a certain time period exceeds a predetermined threshold, "crowded" is determined. If the number of people is equal to or less than the predetermined threshold, "not crowded" is determined.

Among the human detection result information, the reservation information, and the location information described above, for example, a manager or the like of the space 2 determines in advance which information is to be used to control display on the display unit 21.

Among the human detection result information, the reservation information, and the location information, multiple types of information may be used to control display on the display unit 21. For example, in the case where persons are present inside a space 2 and where no persons are present outside the space 2, when the purpose of the reservation of the space 2 is a secret business negotiation, the display controller 56 controls display on the display unit 21 so that a string, "Advertisement XXX", is displayed for the persons inside the space 2 and an opaque image is displayed in the other display area.

When multiple types of information among the human detection result information, the reservation information, and the location information are used, the types of information may be given priorities. For example, assume that the human detection result information, the reservation information, and the location information are given a higher priority, a medium priority, and a lower priority, respectively. In this case, the human detection result information is used most priorly. Thus, for example, when display on the display unit 21 is to be turned off on the basis of the human detection result information, regardless of the reservation information and the location information, display on the display unit 21 is turned off. The rule for use of multiple types of information is not limited to a rule based on priority. For example, through an operation performed by a manager or the like of the space 2, prioritized information may be determined among the human detection result information, the reservation information, and the location information.

In this example, the human detection result information, the reservation information, and the location information are described. Information used for control of display on a display unit 21 is not limited to these types of information. For example, display on the display unit 21 may be controlled on the basis of information which is input by a manager of the space 2. For example, display on the display unit 21 may be controlled on the basis of information that is input by a person inside the space 2 or information that is input by a person outside the space 2. Specifically, for example, when a user of the space 2 does not want to be viewed from the outside, the user may perform an operation so that an opaque image is displayed.

Other Exemplary Configurations of a Space 2

Other exemplary configurations of a space 2 will be described. In the present exemplary embodiment, multiple display units 21 may be disposed in a space 2. Thus, as an exemplary space 2 having multiple display units 21, a space 2 having two display units 21 will be described.

Figure 7:
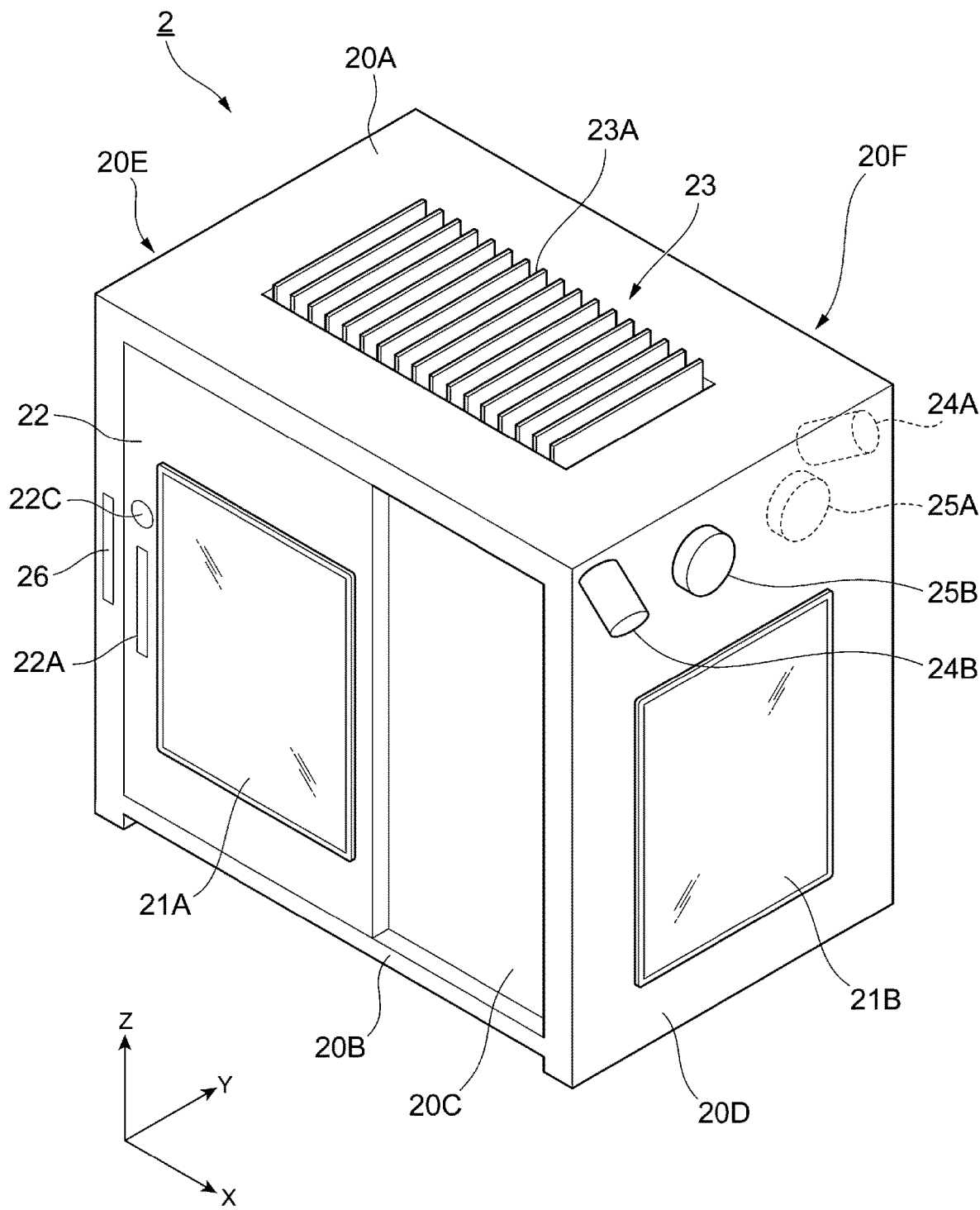
FIG. 7 is a diagram for describing an exemplary external configuration of a space when two display units are disposed.

FIG. 7 is a diagram for describing an exemplary external configuration of a space 2 having two display units 21.

In the space 2 illustrated in FIG. 7, a display unit 21A is disposed in the door 22, and a display unit 21B is disposed in the wall 20D. The display unit 21A and the display unit 21B, like the display unit 21 in FIG. 2, are transmissive display units which display images. The display unit 21A is disposed instead of the member 22B in FIG. 2. The display unit 21B is disposed at the same position as that of the display unit 21 in FIG. 2.

Control of display on the display unit 21A and the display unit 21B will be described. The display controller 56 may exert control so that a display on the display unit 21A is the same as or different from a display on the display unit 21B.

In the case where a display on the display unit 21A is different from a display on the display unit 21B, for example, the display unit 21A is used as a display unit which displays images for persons outside the space 2, and the display unit 21B is used as a display unit which displays images for persons inside the space 2. In this case, the display unit 21B is used as an exemplary first display unit. The display unit 21A is used as an exemplary second display unit.

FIGS. 8A to 8D are diagrams illustrating exemplary cases in which displays of the two display units 21 (in this example, the display unit 21A and the display unit 21B) are different from each other.

Figure 8A:
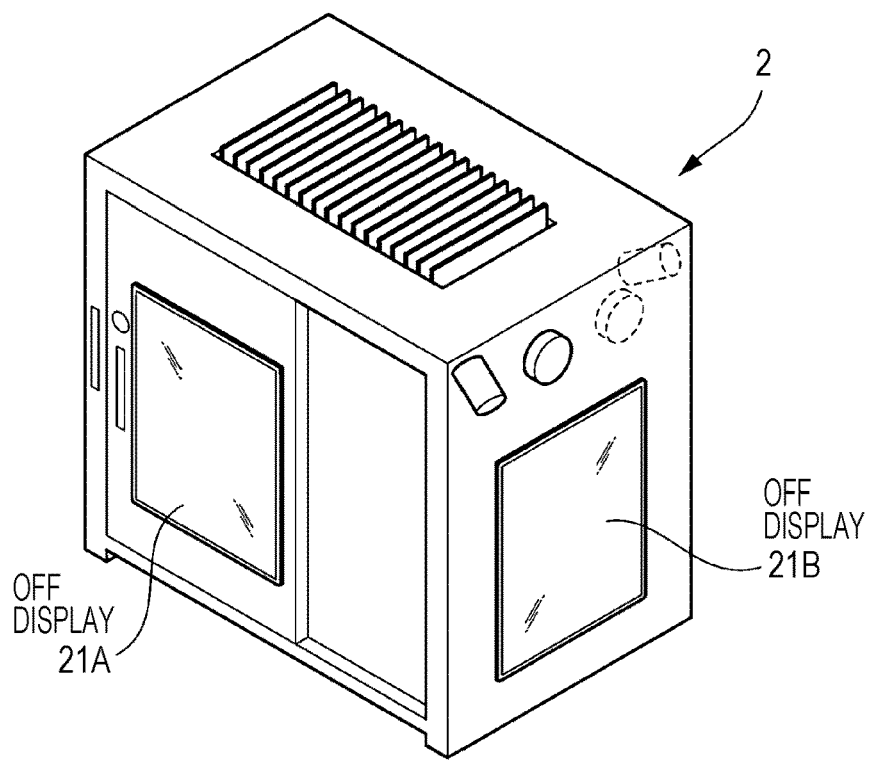
FIGS. 8A to 8D are diagrams illustrating examples in the case where displays on two display units are made different from each other.

For example, as illustrated in FIG. 8A, in the case where persons are present neither inside nor outside a space 2, the display controller 56 turns off display on the display unit 21A and display on the display unit 21B.

Figure 8B:
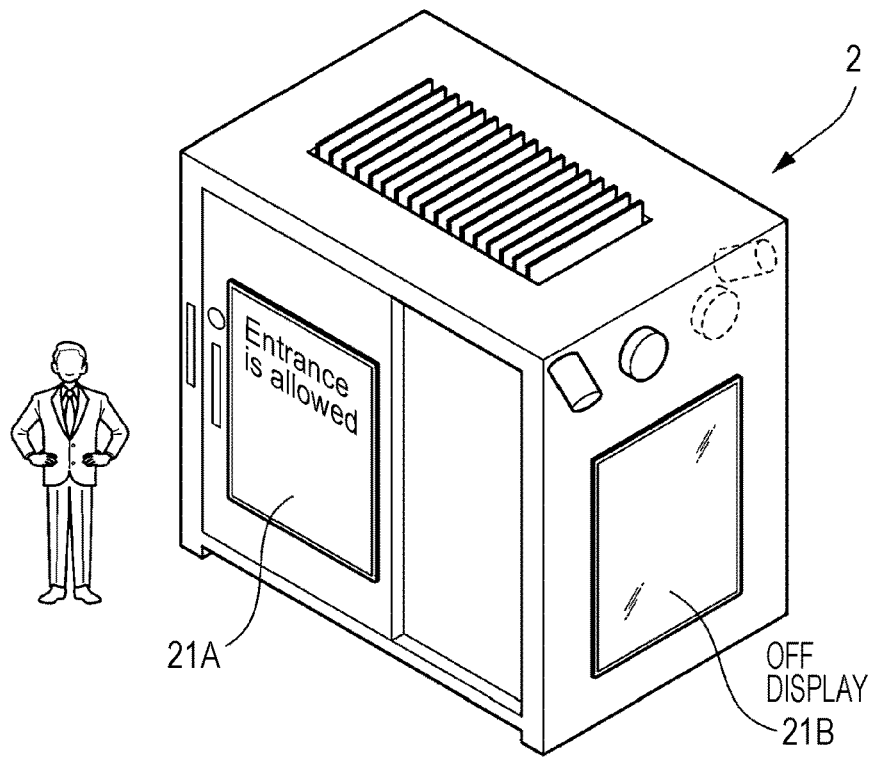

For example, as illustrated in FIG. 8B, in the case where no persons are present inside the space 2 and where a person is present outside the space 2, the display controller 56 controls display on the display unit 21A so that an image is displayed for the person outside the space 2. In this example, as a message for notifying the person outside that no persons are present inside, a string, "Entrance is allowed," is displayed on the display unit 21A. Display on the display unit 21B is turned off.

Figure 8C:
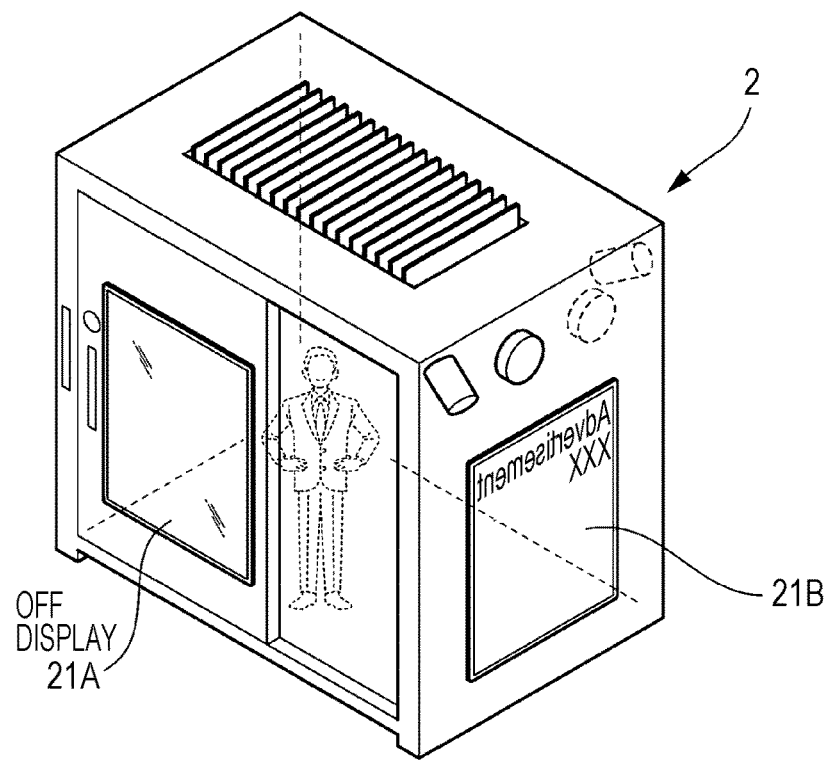

For example, as illustrated in FIG. 8C, in the case where a person is present inside the space 2 and where no persons are present outside the space 2, the display controller 56 controls display on the display unit 21B so that an image is displayed for the person inside the space 2. In this example, as an advertisement, a string, "Advertisement XXX", is displayed for the person inside. Display on the display unit 21A is turned off.

Figure 8D:
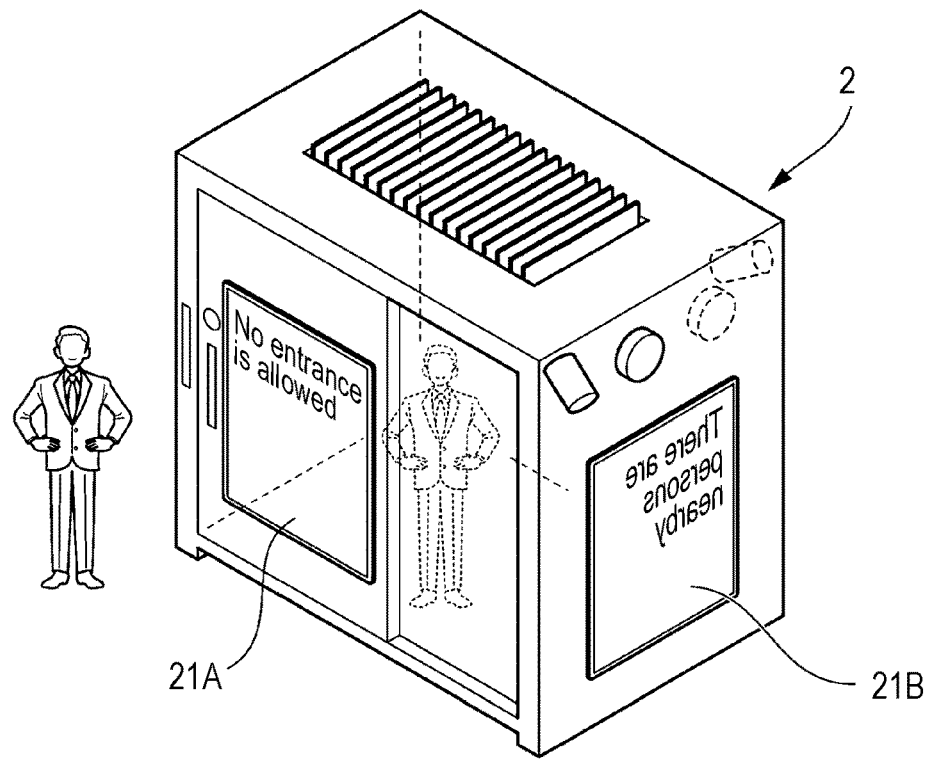

For example, as illustrated in FIG. 8D, in the case where persons are present both inside and outside the space 2, the display controller 56 controls display on the display unit 21A so that an image is displayed for the person outside the space 2. In addition, the display controller 56 controls display on the display unit 21B so that an image is displayed for the person inside the space 2. In this example, as a message for notifying the person outside that a person is present inside, a string, "No entrance is allowed," is displayed on the display unit 21A. In addition, as a message for notifying the person inside that a person is present near the space 2, a string, "There are persons nearby," is displayed on the display unit 21B.

Figure 9:
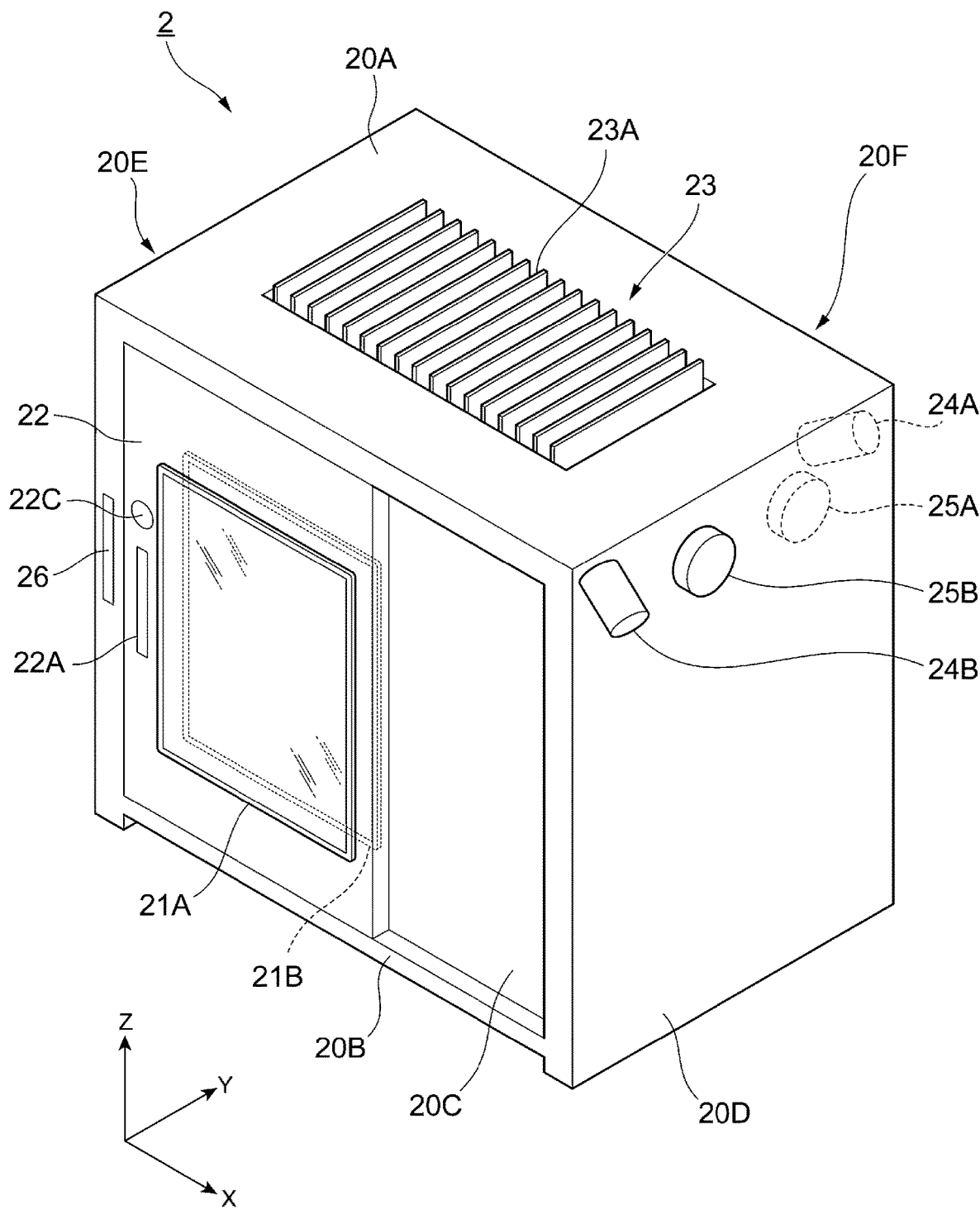
FIG. 9 is a diagram for describing an exemplary external configuration of a space in which two display units are disposed back to back.

Two display units 21 may be disposed back to back. FIG. 9 is a diagram for describing an exemplary external configuration of a space 2 in which two display units 21 are disposed back to back. In the example in FIG. 9, the display unit 21A and the display unit 21B are disposed in the door 22. Also in this case, for example, the display unit 21A is used as a display unit which displays images for persons outside the space 2, and the display unit 21B is used as a display unit which displays images for persons inside the space 2.

The display unit 21A may receive input of information from persons outside the space 2, and the display unit 21B may receive input of information from persons inside the space 2. Specifically, the display unit 21A and the display unit 21B are touch panels, and receive operations from persons inside and outside the space 2. The external information acquiring unit 53 uses the display unit 21A to obtain information received from persons outside the space 2. The internal information acquiring unit 52 uses the display unit 21B to obtain information received from persons inside the space 2. The display controller 56 controls display on the display unit 21A on the basis of information obtained by the external information acquiring unit 53. The display controller 56 controls display on the display unit 21B on the basis of information obtained by the internal information acquiring unit 52.

When the display unit 21A receives input, the display controller 56 may display images on the display unit 21B in accordance with the input. When the display unit 21B receives input, the display controller 56 may display images on the display unit 21A in accordance with the input. In other words, the display controller 56 may control display on the display unit 21B on the basis of information obtained by the external information acquiring unit 53. The display controller 56 may control display of the display unit 21A on the basis of information obtained by the internal information acquiring unit 52.

Figure 10:
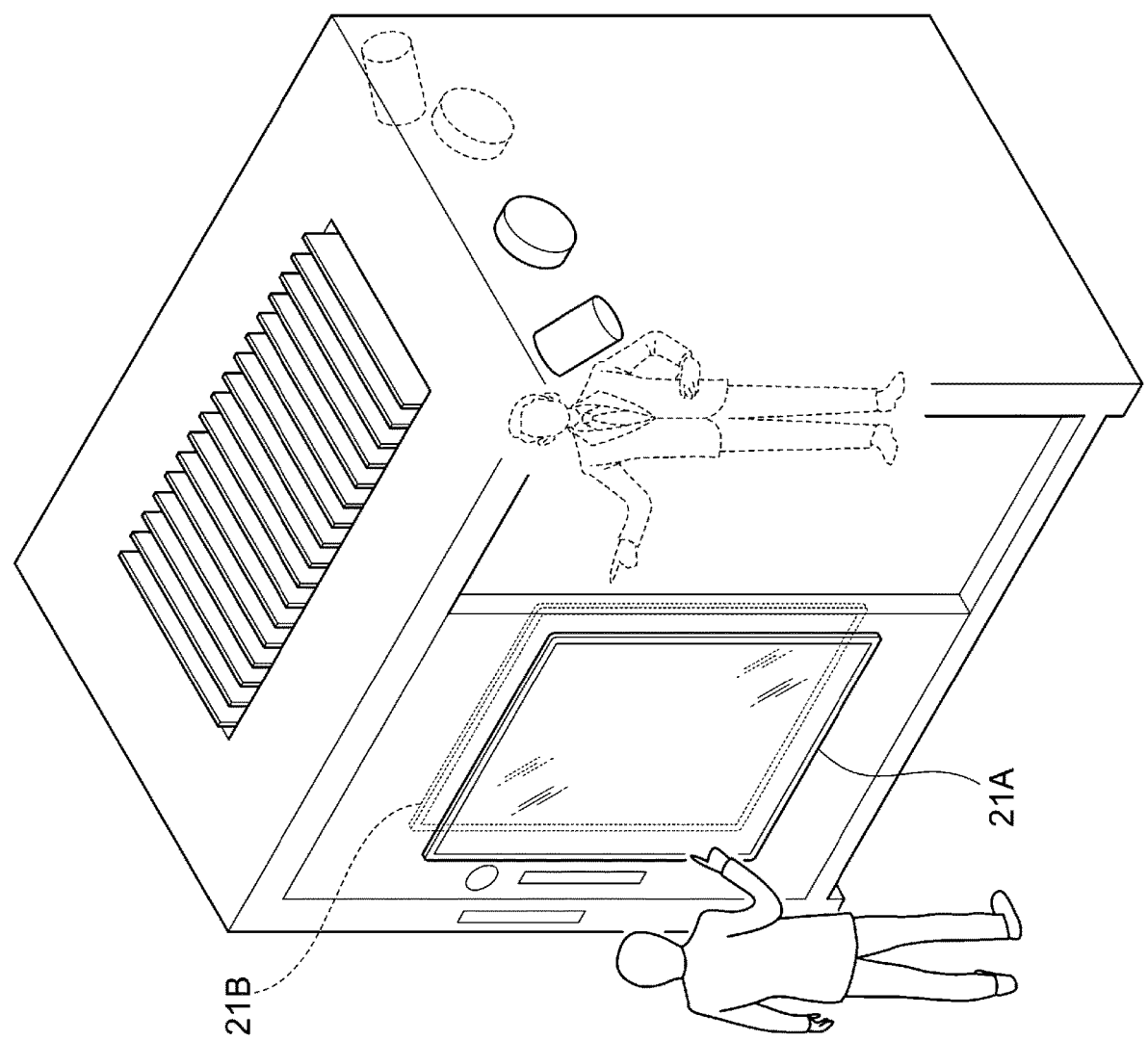
FIG. 10 is a diagram for describing an example in the case where, in accordance with input received by a display unit, an image is displayed on a different display unit.

FIG. 10 is a diagram for describing an exemplary case in which, in accordance with input received by the display unit 21A, images are displayed on the different display unit 21B. For example, when a person outside the space 2 inputs a string on the display unit 21A, the string which has been input on the display unit 21A is displayed on the display unit 21B. When a person who is located inside the space 2 and who views the string displayed on the display unit 21B inputs a string as a reply on the display unit 21B, the string that is input on the display unit 21B is displayed on the display unit 21A. These processes cause information to be received/transmitted while persons outside and inside the space 2 check their communication target's face or figure through the door 22.

In this example, the case, in which a person outside a space 2 and a person inside the space 2 receive/transmit information from/to each other in the configuration in which two display units 21 are disposed back to back, is described. As illustrated in FIG. 7, also in the configuration in which two display units 21 are not disposed back to back, a person outside the space 2 may receive/transmit information from/to a person inside the space 2. In the example in FIG. 7, a person outside the space 2 operates the display unit 21A, and a person inside the space 2 operates the display unit 21B, achieving reception/transmission of information.

A unit through which the display unit 21A and the display unit 21B receive input of information is not limited to a touch panel. For example, each of the display unit 21A and the display unit 21B may include a directional microphone, and may receive input of information through a person's voice.

In the present exemplary embodiment, as long as a display unit 21 is disposed so that the inside of the space 2 is viewed from the outside of the space 2, any configuration may be employed. The position, at which the display unit 21 is disposed, is not limited to the wall 20D or the door 22. For example, the display unit 21 may be disposed in the ceiling 20A or in the floor 20B. In other words, for example, the display unit 21 is disposed in a partition unit which separates the inside of the space 2 from the outside of the space 2. In the present exemplary embodiment, for example, the ceiling 20A, the floor 20B, the walls 20C to 20F, and the door 22 are used as exemplary partition units.

In the present exemplary embodiment, the size of the display unit 21 is not limiting. For example, the display unit 21 may be disposed over the entire wall 20D. For example, the display unit 21 may be disposed in the walls 20C to 20F so as to extend around the space 2 by 360 degrees.

A program for implementing the exemplary embodiments of the present disclosure may be provided, not only from a communication unit, but also through storage in a storage medium such as a compact disc-read-only memory (CD-ROM).

The various exemplary embodiments and modified examples are described above. As a matter of course, these exemplary embodiments and modified examples are combined with each other.

The present disclosure is not limited to the exemplary embodiments described above. Various exemplary embodiments may be carried out without departing from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A booth comprising:
    at least one display unit that is transmissive and displays an image,
    wherein the at least one display unit is disposed in such a manner that an inside of a space which allows a person's entrance is viewed from an outside of the space, and
    wherein a display on the at least one display unit is changed on a basis of reservation information about a reservation of the space.

2. A booth comprising:
    at least one display unit that is transmissive and displays an image,
    wherein the at least one display unit is disposed in such a manner that an inside of a space which allows a person's entrance is viewed from an outside of the space,
    wherein the display on the at least one display unit is changed on a basis of a human detection result, the at least one display unit being changed on a basis of (a) a detection result indicating whether or not a person is present inside the space, (b) in such a manner that an image is displayed for the person inside the space when a person is present inside the space and a person is not present outside the space, (c) in such a manner that an image is displayed for the person outside the space when a person is not present inside the space and a person is present outside the space, and/or (d) in such a manner that a specific image is displayed for the person inside the space and a different image is displayed, the different image hindering the inside of the space from being viewed through the at least one display unit from the outside of the space when persons are present both inside and outside the space.

3. The booth according to claim 2,
    wherein the display on the at least one display unit is changed on the basis of the detection result indicating whether or not the person is present inside the space.

4. The booth according to claim 2,
    wherein the display on the at least one display unit is changed on a basis of a detection result indicating whether or not a person is present outside the space.

5. The booth according to claim 2,
    wherein, when the person is present inside the space and the person is not present outside the space, the display on the at least one display unit is changed in such a manner that the image is displayed for the person inside the space.

6. The booth according to claim 2,
wherein, when the person is not present inside the space and the person is present outside the space, the display on the at least one display unit is changed in such a manner that the image is displayed for the person outside the space.

7. The booth according to claim 2,
wherein, when persons are present both inside and outside the space, the display on the at least one display unit is changed in such a manner that the specific image is displayed for the person inside the space and the different image is displayed.

8. The booth according to claim 1,
wherein the at least one display unit comprises two display units, and
wherein displays of the two display units are different from each other.

9. The booth according to claim 8,
wherein a first display unit of the two display units is a display unit that displays an image for a person inside the space, and a second display unit of the two display units is a display unit that displays an image for a person outside the space.

10. The booth according to claim 8,
wherein a first display unit of the two display units receives input of information from a person inside the space, and a second display unit of the two display units receives input of information from a person outside the space.

11. The booth according to claim 10,
wherein, when the first display unit receives input, an image is displayed on the second display unit in accordance with the input.

12. The booth according to claim 1,
wherein the reservation information describes a purpose of the reservation of the space, and
wherein the display on the at least one display unit is changed on a basis of the information about the purpose.

13. A booth comprising:
at least one display unit that is transmissive and displays an image,
wherein the at least one display unit is disposed in such a manner that an inside of a space which allows a person's entrance is viewed from an outside of the space,
wherein the display on the at least one display unit is changed on a basis of location information about a location at which the booth is disposed.

14. The booth according to claim 13,
wherein the location information describes an environment around the location at which the booth is disposed, and
wherein the display on the at least one display unit is changed on a basis of the information about the environment.

15. The booth according to claim 14,
wherein the information about the environment describes color of a surrounding area of the location at which the booth is disposed, and
wherein the display on the at least one display unit is changed in such a manner that an image of the color of the surrounding area is displayed.

16. The booth according to claim 13,
wherein, on a basis of the location information, when the location at which the booth is disposed satisfies a specific condition, the display on the at least one display unit is changed in such a manner that a display which is inhibited in a location satisfying the specific condition is not made.

17. The booth according to claim 13,
wherein the location information describes travelling of the location at which the booth is disposed, and
wherein the display of the at least one display unit is changed in accordance with the travelling of the location.

18. An apparatus comprising:
a space that allows a person's entrance;
a partition unit that separates an inside of the space from an outside of the space; and
a display unit that is transmissive and displays an image,
wherein the display unit is disposed in the partition unit, and
wherein a display on the display unit is changed on a basis of reservation information about a reservation of the space.

19. A booth comprising:
means for displaying an image by using a transmissive display unit,
wherein the display unit is disposed in such a manner that an inside of a space which allows a person's entrance is viewed from an outside of the space, and
wherein a display on the at least one display unit is changed on a basis of reservation information about a reservation of the space.

* * * * *